United States Patent
Pederson et al.

(10) Patent No.: US 7,555,500 B2
(45) Date of Patent: Jun. 30, 2009

(54) OPTIMIZED END TRANSACTION PROCESSING

(75) Inventors: Donald R. Pederson, San Diego, CA (US); James B. Chapman, Glendale, CA (US)

(73) Assignee: Teradata US, Inc., Miamisburg, OH (US)

( * ) Notice: Subject to any disclaimer, the term of this patent is extended or adjusted under 35 U.S.C. 154(b) by 929 days.

(21) Appl. No.: 09/784,392

(22) Filed: Feb. 15, 2001

(65) Prior Publication Data

US 2002/0112094 A1    Aug. 15, 2002

(51) Int. Cl.
*G06F 17/30* (2006.01)
(52) U.S. Cl. .................... 707/202; 711/111
(58) Field of Classification Search ............ 707/201, 707/202, 1, 200, 205; 709/101; 717/143; 711/100, 102, 111
See application file for complete search history.

(56) References Cited

U.S. PATENT DOCUMENTS

| | | | | |
|---|---|---|---|---|
| 4,507,751 A | | 3/1985 | Gawlick et al. | 364/900 |
| 5,006,978 A | * | 4/1991 | Neches | 707/104.1 |
| 5,261,089 A | | 11/1993 | Coleman et al. | 395/600 |
| 5,263,156 A | * | 11/1993 | Bowen et al. | 707/202 |
| 5,544,359 A | * | 8/1996 | Tada et al. | 707/202 |
| 5,751,962 A | | 5/1998 | Fanshier et al. | 395/200.53 |
| 5,764,905 A | * | 6/1998 | Catozzi et al. | 709/215 |
| 5,778,168 A | * | 7/1998 | Fuller | 714/18 |
| 5,799,305 A | * | 8/1998 | Bortvedt et al. | 707/10 |
| 5,832,508 A | * | 11/1998 | Sherman et al. | 707/200 |
| 5,841,972 A | | 11/1998 | Fanshier | 395/200.5 |
| 5,864,842 A | | 1/1999 | Pederson et al. | 707/3 |
| 5,864,849 A | * | 1/1999 | Bohannon et al. | 707/8 |
| 5,884,299 A | | 3/1999 | Ramesh et al. | 707/2 |
| 5,884,327 A | | 3/1999 | Cotner et al. | |
| 5,922,072 A | | 7/1999 | Hutchinson et al. | 713/2 |
| 5,933,601 A | | 8/1999 | Fanshier et al. | 395/200.53 |
| 5,956,704 A | * | 9/1999 | Gautam et al. | 707/1 |
| 5,960,181 A | | 9/1999 | Sanadidi et al. | 395/500 |
| 5,961,642 A | | 10/1999 | Lewis | 713/1 |
| 5,978,576 A | | 11/1999 | Sanadidi et al. | 395/500.43 |

(Continued)

FOREIGN PATENT DOCUMENTS

JP        09-231059        9/1997

OTHER PUBLICATIONS

Gray, J. and Reuter, A. "Transaction Processing: Concepts and Techniques", Morgan-Kaufman, CA. 1993.*

(Continued)

*Primary Examiner*—Leslie Wong
(74) *Attorney, Agent, or Firm*—Trop, Pruner & Hu, P.C.; Charles Maney

(57) ABSTRACT

An end transaction procedure is optimized for certain database operations. Where a transaction preceding the end transaction procedure includes a step that employs all the access modules in the transaction, a flush of the transaction log is performed during execution of the last step of the transaction. The need to flush the transaction log during the subsequent end transaction procedure is obviated. The end transaction procedure further may check to determine whether the transaction log was previously flushed, rather than always flushing the transaction log. Also, where the access modules involved in a transaction are part of the same cluster, certain broadcast operations of the end transaction procedure may be avoided.

43 Claims, 10 Drawing Sheets

U.S. PATENT DOCUMENTS

| | | | |
|---|---|---|---|
| 5,999,931 A * | 12/1999 | Breitbart et al. | 707/10 |
| 6,038,587 A | 3/2000 | Phillips et al. | |
| 6,112,287 A * | 8/2000 | Litaize et al. | 712/11 |
| 6,202,079 B1 * | 3/2001 | Banks | 709/101 |
| 6,321,234 B1 * | 11/2001 | Debrunner | 707/202 |
| 6,374,243 B1 * | 4/2002 | Kobayashi et al. | 707/8 |
| 6,408,341 B1 * | 6/2002 | Feeney et al. | 709/250 |
| 6,438,582 B1 * | 8/2002 | Hsiao et al. | 709/206 |
| 6,510,421 B1 * | 1/2003 | Ganesh et al. | 707/1 |
| 6,519,614 B1 * | 2/2003 | Kanai et al. | 707/202 |
| 6,539,414 B1 * | 3/2003 | Klein et al. | 709/101 |
| 6,651,073 B1 * | 11/2003 | Lyle et al. | 707/202 |
| 6,684,223 B1 * | 1/2004 | Ganesh et al. | 707/200 |

OTHER PUBLICATIONS

Lampson, B. and Lomet, D., "A New Presumed Commit Optimization for Two Phase Commit", Feb. 10, 1993.*
See 1 in Addendum.
See 2 in Addendum.
See 3 in Addendum.
See 4 in Addendum.

* cited by examiner

OPTIMIZING END TRANSACTION PROCESSING

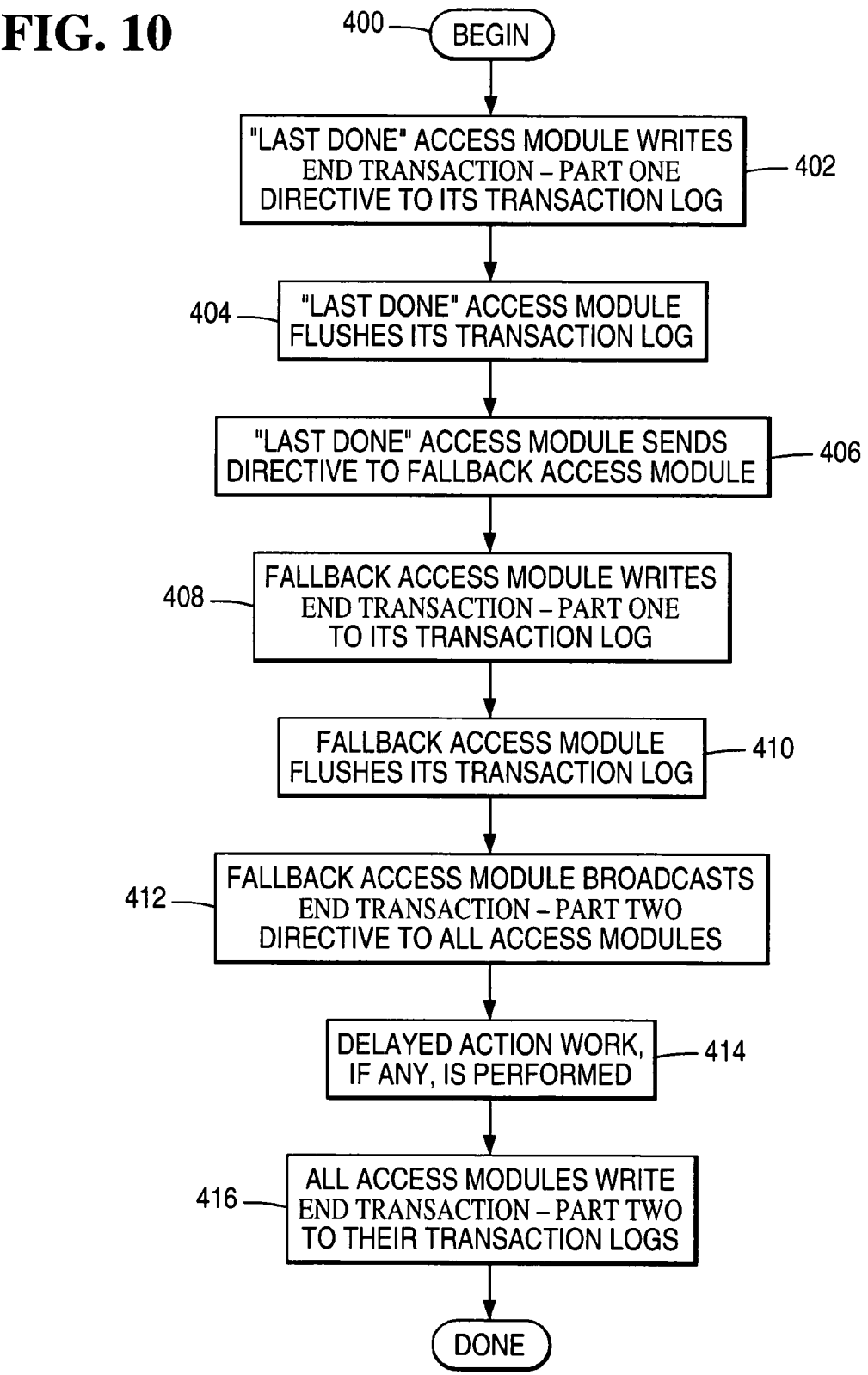

OPTIMIZED END TRANSACTION PROCESSING

TECHNICAL FIELD

The invention relates to database management and, more particularly, to optimization of end transaction processing.

BACKGROUND

Relational databases are used for storage and retrieval of information. The information is structured in the database as two-dimensional tables of rows and columns. A column heading designates the type of data stored in each column. The information is stored in a non-volatile medium such as a disk array.

Users may access the database information typically by using database management software. The database storage and management software together comprise a database management system, or DBMS. DBMSs may be implemented on a centralized mainframe system, or may be distributed in a client-server network.

The database management software includes specialized commands for accessing the database information. For example, a common command for accessing data is a Structured Query Language (SQL) "select" query. Using the select query, one or more rows from one or more tables of the database may be retrieved.

The database contents are typically stored in a non-volatile storage such as a disk drive. However, during transaction processing, a copy of the data may be stored in a volatile storage, such as a memory or cache. Typically, the data is manipulated while in the cache, then transferred to the storage upon completion of the operation.

Database management systems typically include a number of features, which facilitate database access. These features permit users to retrieve and store information quickly, allow multiple users to access the database simultaneously, and enable the database to grow to a large size without a reduction in performance during database retrievals. For many applications, a high degree of reliability as well as optimum performance are expected.

Transaction management is one important aspect of a DBMS. Concurrency control, or ensuring that multiple users may access and update the database simultaneously, is one aspect of transaction management. Recovery is another priority for transaction management. Particularly where the database is distributed, there may be an increased likelihood that some portion of the database is rendered useless, such as by an unexpected power disruption. Recovery operations decide which transactions are "committed" and which are to be "rolled back" following the disruption.

Recovery generally is performed by keeping track of a transaction somehow, in anticipation of a DBMS failure. For example, a technique known as write-ahead logging (WAL) employs a transaction log to keep track of every action or operation performed on the database. Under the WAL protocol, both the transaction log and the data are updated in volatile storage, such as memory. Upon completion of the transaction, the transaction log is transferred from the volatile storage to stable storage (e.g., a drive) before the data is stored there. Further, the transaction is regarded as "committed" after the transaction log is transferred to stable storage, but before the data is transferred to stable storage. This transfer from volatile to stable storage is known as a "flush." The WAL protocol allows the DBMS to transfer the data to stable storage at a more convenient time.

During transaction processing, writes to volatile storage (e.g., memory) are more efficient than writes to stable storage (e.g., drive). As transactions are often performed back-to-back as a series of steps, writes of the transaction log to memory may be performed more often, in some cases, than are needed to maintain full recovery capability of the DBMS.

Thus, there is a continuing need to optimize transaction logging operations.

SUMMARY

In general, a method of performing a transaction in a database system comprises receiving a transaction to be performed, wherein the transaction is processed by a plurality of access modules. A flush of a transaction log is performed in each access module before an end transaction procedure.

Other or alternative features will become apparent from the following description, from the drawings, and from the claims.

BRIEF DESCRIPTION OF THE DRAWINGS

FIG. 10 is a flow diagram of an optimized end transaction following commitment of a transaction according to one embodiment of the invention.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. In particular, reference is made to the Structured Query Language (SQL) and to the Teradata database management system by NCR Corporation, to illustrate specific embodiments for practicing the invention. However, the invention may be practiced using other database query languages and other database management systems, without departing from the spirit of the invention.

According to the embodiments described herein, a relational database management system (RDBMS) may optimize the execution of certain transactions. Three optimizations are described, below. First, however, an introduction to transaction processing and an environment in which the transaction processing may be performed, is provided.

Environment

A typical relational database management system (RDBMS) includes physical storage for the information, software for accessing and updating the information, and one or more processors for executing the software. One example is the Teradata RDBMS, a product of NCR Corporation of Dayton, Ohio. The Teradata architecture supports parallel processing which allows a query to be distributed among independent processing nodes. Each node may independently work on a part of the query.

Figure 1:
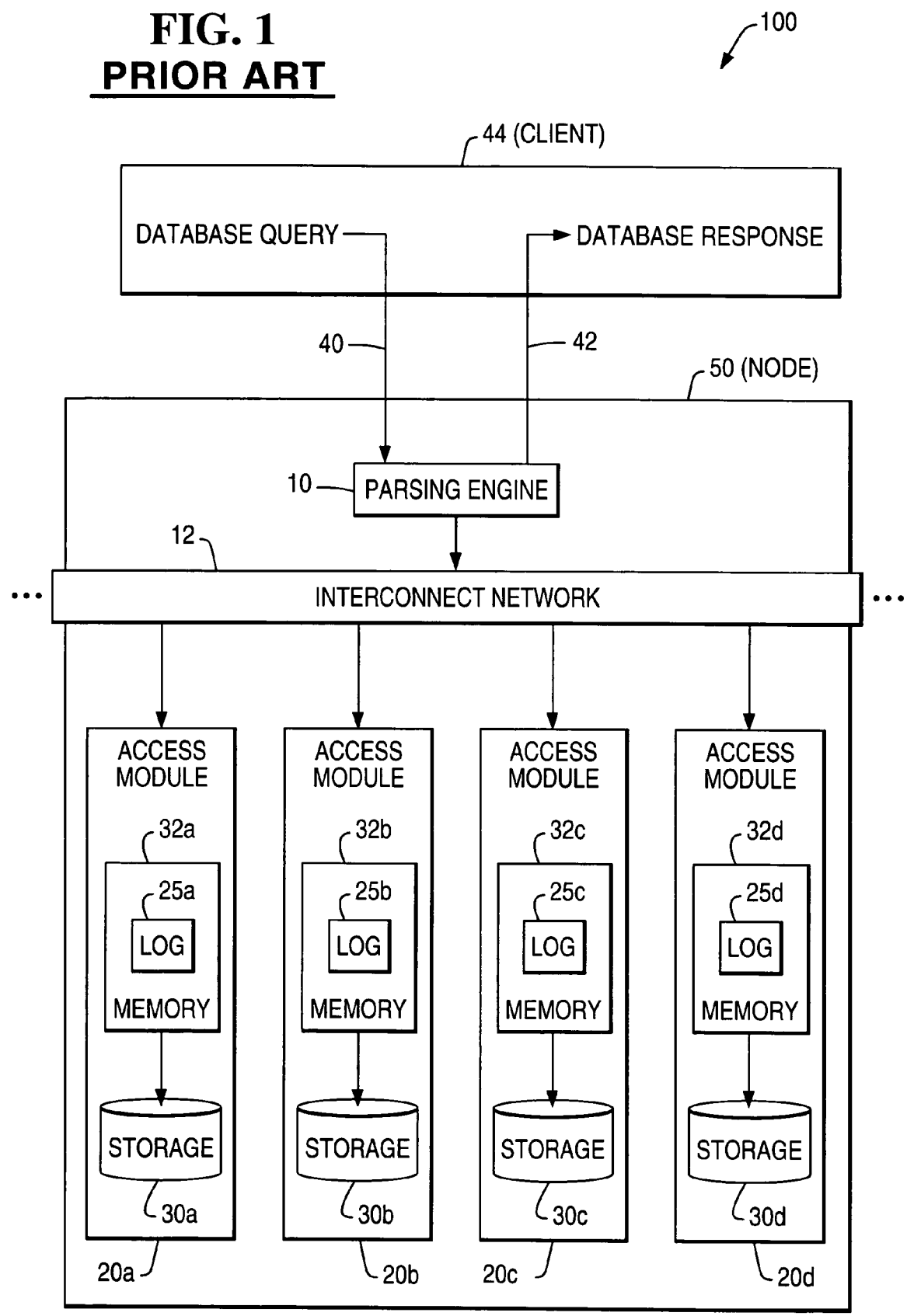
FIG. 1 is a block diagram of a relational database management system according to one embodiment of the invention.

FIG. 1 illustrates one embodiment of a Teradata RDBMS 100. The RDBMS 100 includes one or more nodes 50, each of which is an independent entity of the RDBMS 100. The RDBMS 100 supports single-node multi-processing or symmetric multi-processing (SMP), in which the node 50 is the only node of the RDBMS 100. Alternatively, the RDBMS 100 may be a massively parallel processing (MPP) system, wherein the node 50 is but one of plural nodes.

The node 50 of the RDBMS 100 includes a parsing engine 10, and four access modules 20a, 20b, 20c, and 20d. Between the parsing engine 10 and the access modules 20 is an interconnect network 12. In other embodiments, the node 50 may include multiple parsing engines 10 and a different number of access modules 20.

The parsing engine 10 is a virtual processor. In one embodiment, the parsing engine 10 receives an incoming database request or query 40, such as from an application program or client 44, and produces a database response 42, typically back to the application program or client 44. The parsing engine 10 splits SQL statements within the database query 40 into executable steps, each of which may be processed by distinct access modules 20 simultaneously. Additionally, the parsing engine 10 may optimize the database query 40 before the steps are distributed to the access modules 20.

The access module 20 is responsible for the creation and update of the database contents. Accordingly, each access module 20 is associated with both a volatile storage 32, such as a memory, and a non-volatile storage 30, such as a hard disk drive or disk array. Typically, transactions on the data are performed in the memory 32, then transferred to the storage 30 at a later time.

In one embodiment, the database contents are distributed among the storage media 30. For example, in FIG. 1, storage media 30a may store a first row of a table, storage media 30b may store a second row of the table, storage media 20c may store a third row of the table, and so on. Each access module 20 is a virtual processor and may be moved to another node 50, as needed, such as in the case of a hardware failure.

The interconnect network 12 connects the parsing engine 10 to the access modules 20. Additionally, the interconnect network 12 may connect the node 50 to other nodes within the RDBMS 100. When the parsing engine 10 dispatches the steps for the access modules 20 to perform, they are dispatched onto the interconnect network 12, then routed to the appropriate access module 20. The dispatch may be a broadcast, which all access modules 20 receive, a multicast, intended for selected modules, or a unicast, in which a single access module 20 receives the dispatch.

In one embodiment, the RDBMS 100 processes SQL requests 40. The SQL requests 40 are received by the RDBMS 100 from the client 44. Likewise, the database response 42 is sent to the client 44. The parsing engine 10 acts as a transaction manager, distributing portions of the query request 40 to the various access modules 20. The parsing engine 10 may further optimize the query requests, such as to improve the responsiveness of the RDBMS 100.

The arrangement of FIG. 1 is illustrative only, as other embodiments may employ other arrangements of a database system.

Transaction Processing

A transaction is a group of one or more SQL statements for accessing the database. To ensure database integrity, all parts (steps) of the transaction are executed or none of them is executed. (This principle is known as atomicity.) Because the steps of the transaction are distributed and may be performed during distinct time intervals, the parsing engine 10 communicates with the access modules 20, and vice-versa, during the transaction processing.

Figure 2:
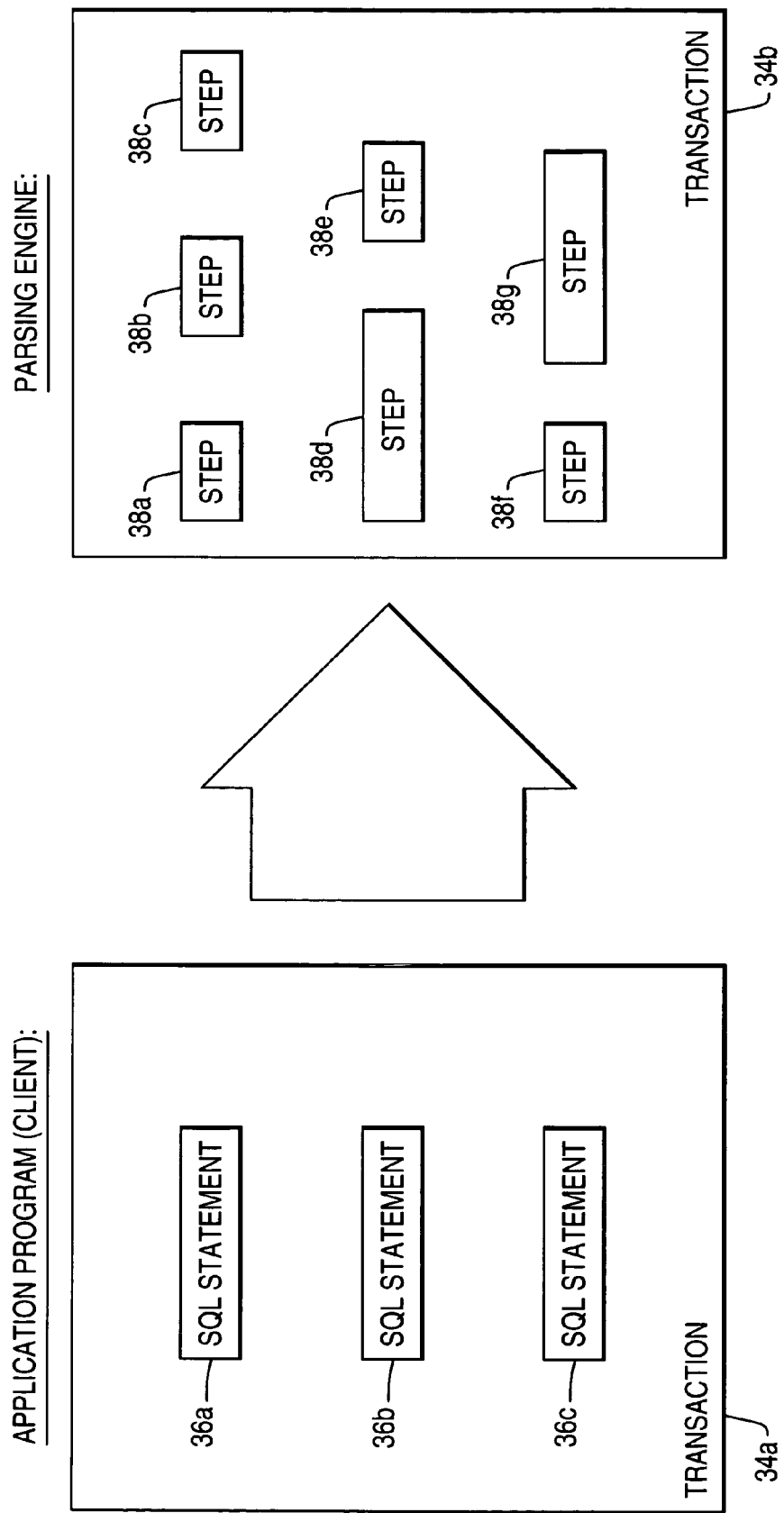
FIG. 2 is a block diagram of a transaction and transaction log according to one embodiment of the invention.

A transaction may commence when the parsing engine 10 receives the database query 40 from the client 44 as a series of one or more SQL statements 36, as depicted in FIG. 2. Transaction 34a consists of three SQL statements 36a, 36b, and 36c. The parsing engine 10 converts each SQL statement 36 into one or more steps 38.

Figure 3:
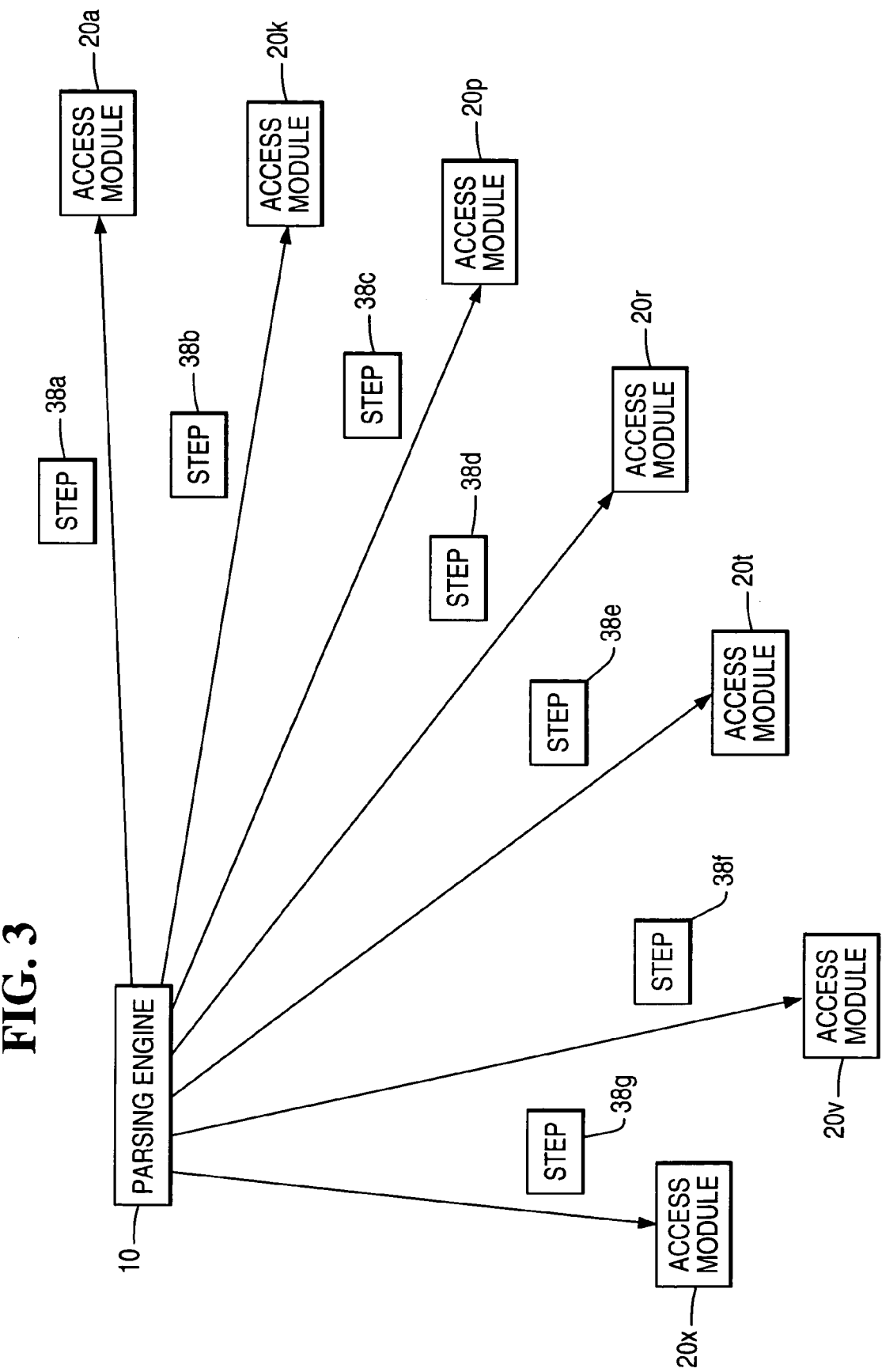
FIG. 3 is a block diagram illustrating distribution of steps of a transaction by the parsing engine according to one embodiment of the invention.

In FIG. 2, SQL statement 36a is converted into three steps 38a, 38b, and 38c, by the parsing engine 10. The three steps 38a, 38b, and 38c may each be performed on a distinct access module 20, such as access modules 20a, 20k, and 20p, respectively, as depicted in FIG. 3. Alternatively, one or more of the steps 38 may be performed on multiple access modules 20.

Suppose the transaction 34 involves three steps, 38a, 38b, and 38c. Suppose that the access modules 20 involved in the transaction are access modules, 20a, 20k, and 20p. Step 38a may be performed on access module 20a and 20k. Step 38b may be performed on access module 20k only. Step 38c may be performed on access module 20a, 20k, and 20p. Step 38c is known as an "all transaction group" step because all access modules 20 involved in the transaction (access modules 20a, 20k, and 20p) perform the step. This example is merely illustrative; the steps 38 of the transaction 34 may be distributed among access modules 20 in a variety of ways.

The parsing engine 10 next receives the SQL statement 36b, and converts it into steps 38d and 38e. Steps 38d and 38e may be distributed among distinct access modules 20, such as access modules 20r and 20t, as depicted in FIG. 3. SQL statement 36c is converted into steps 38f and 38g. Steps 38f and 38g may be distributed among access modules 20 of the RDBMS 100, such as access modules 20v and 20x. The work to process the transaction 34 may thus be distributed among a number of database entities.

For each step 38 of the transaction 34, one or more entries are made in a transaction log 25. Each access module 20 includes its own transaction log, shown as logs 25a, 25b, 25c, and 25d in FIG. 1. Because the work of each transaction 34 may be distributed among many access modules 20, the transaction log 25 for that transaction is also distributed.

For each step of the transaction 34, both an UNDO and a REDO entry are recorded by the access module 20 in its transaction log 25. The UNDO and REDO entries enable a transaction that was interrupted to be completed, either in the forward (REDO) or backward (UNDO) direction, as appropriate.

Figure 4:
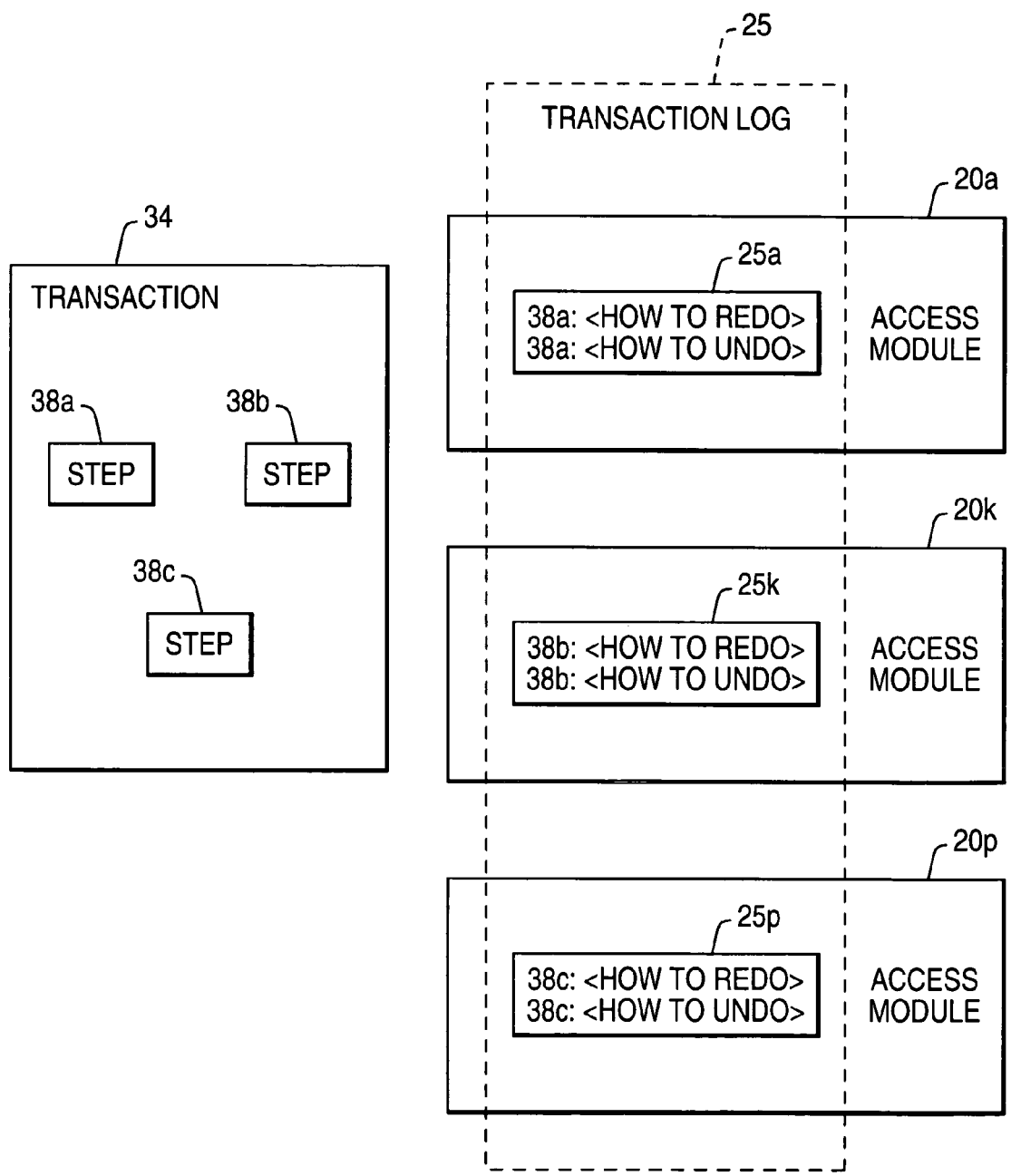
FIG. 4 is a block diagram illustrating operation of the parsing engine according to one embodiment of the invention.

For example, in FIG. 4, transaction 34 includes three steps 38a, 38b, and 38c. Each step 38 may be distributed to a distinct access module 20 (see FIG. 3, for example). Step 38a is sent by the parsing engine 10 to access module 20a. Accordingly, transaction log 25a includes entries for both redoing and undoing step 38a. Step 38b is sent to access module 20k. Transaction log 25k likewise includes both redo and undo entries for step 38b. For the transaction 34, the transaction log 25 includes three distinct logs 25a, 25k, and 25p, generated by three distinct access modules 20a, 20k, and 20p.

In one embodiment, the transaction log 25 is recorded according to the write-ahead logging (WAL) protocol. Under the WAL protocol, the transaction log 25, not the manipulated data itself, is transferred, or flushed, to stable storage 30 before the transaction 34 may be committed. Ideally, the flush of the manipulated data to stable storage 30 may occur subsequently, such that system performance is unimpaired.

As explained above, to ensure database integrity, the transaction 34 is processed in its entirety, or not at all. In some cases, both the beginning and the end of a transaction may be identified. Some SQL transactions, for example, commence with a BEGIN TRANSACTION (or BEGIN WORK) directive and end with an END TRANSACTION (or COMMIT WORK) directive. (The BEGIN TRANSACTION directive is not usually passed to the parsing engine 10; instead, the first SQL statement of the transaction is sent.) Between the BEGIN and END directives, the one or more SQL statements 36, comprising the "real" work of the transaction 34, are found. These transactions are known as explicit transactions, because the application program (client) explicitly notifies the parsing engine 10 of when the transaction ends.

Other SQL transactions include no explicit END TRANSACTION statement. Usually limited to single SQL statements, such transactions are known as implicit transactions because the parsing engine 10 automatically ends (e.g., commits) the transaction 34 before sending a response 42 back to the client 44. Implicit transactions may be supported by enabling an "automatic commit" feature in an application interface, for example.

Suppose the transaction 34a of FIG. 2 is an explicit transaction, where SQL statement 36c is an END TRANSACTION directive. The client sends the SQL statement 36a to the parsing engine 10, as the start of the transaction. The parsing engine 10 converts the SQL statement 36a into steps 38a, 38b, and 38c. The step 38a is sent to access module 20a, the step 38b is sent to access module 20k, and the step 38c is sent to access module 20p (FIG. 3). Access modules 20a, 20k, and 20p may be part of the same node, or be distributed to different nodes. The steps 38a, 38b, and 38c are sent to the access modules 20a, 20k, and 20p without waiting for other SQL statements 36 of the transaction 34 to be received from the client 44.

Next, the client 44 sends SQL statement 36b, also part of the transaction 34a, to the parsing engine 10. Again, the parsing engine 10 converts the SQL statement 36b, into steps 38d and 38e, then sends the step 38d to access module 20r and step 38e to access module 20t (FIG. 3), for example. Steps 38a, 38b, 38c, 38d, and 38e are all part of the same transaction 34, yet the end of the transaction 38 is still not known by the parsing engine 10, only by the client 44.

Finally, the client 44 sends the SQL statement 36c, an END TRANSACTION directive, to the parsing engine 10. Only when the END TRANSACTION directive is received by the parsing engine 10 does the parsing engine 10 know that step 38e was the last step before the end of the transaction 34.

Implicit transactions are distinguishable from explicit transactions in that the parsing engine 10 knows all the steps 38 that make up the transaction 34 before processing of the transaction 34 begins. For example, suppose transaction 34a of FIG. 2 includes a single SQL statement 36a instead of three SQL statements. The parsing engine 10 receives the SQL statement 36a and converts the statement to steps 38a, 38b, and 38c.

The parsing engine 10 distributes the steps 38a, 38b, and 38c to access modules 20a, 20k, and 20p, respectively. Access modules 20a, 20k, and 20p comprise a "transaction group." Before processing of the transaction 34a even begins, the parsing engine 10 knows that the step 38c is the last step of the transaction 34a. Knowing the last step of a transaction 34 is valuable because, explicit or implicit, every transaction 34 involves end transaction processing.

End Transaction Processing

End transaction processing ensures that, where a hardware failure disrupts a transaction, the transaction 34 nevertheless may be either reimplemented or rolled back in its entirety. For many RDBMSs, end transaction processing involves multiple phases. Under Teradata, for example, the transaction 34 is not committed until the entire transaction log 25 associated with a transaction 34 is flushed to stable storage 30. In other words, every log 25 for every one of the access modules 20 involved in the transaction 34 is flushed before the transaction 34 is considered committed.

Once flushed, an END TRANSACTION entry may be made in the transaction log 25. In one embodiment, the RDBMS 100 may re-implement the transaction 34 in its entirety even if only one log 25 from one access module 20 includes the END TRANSACTION entry.

Figure 5:
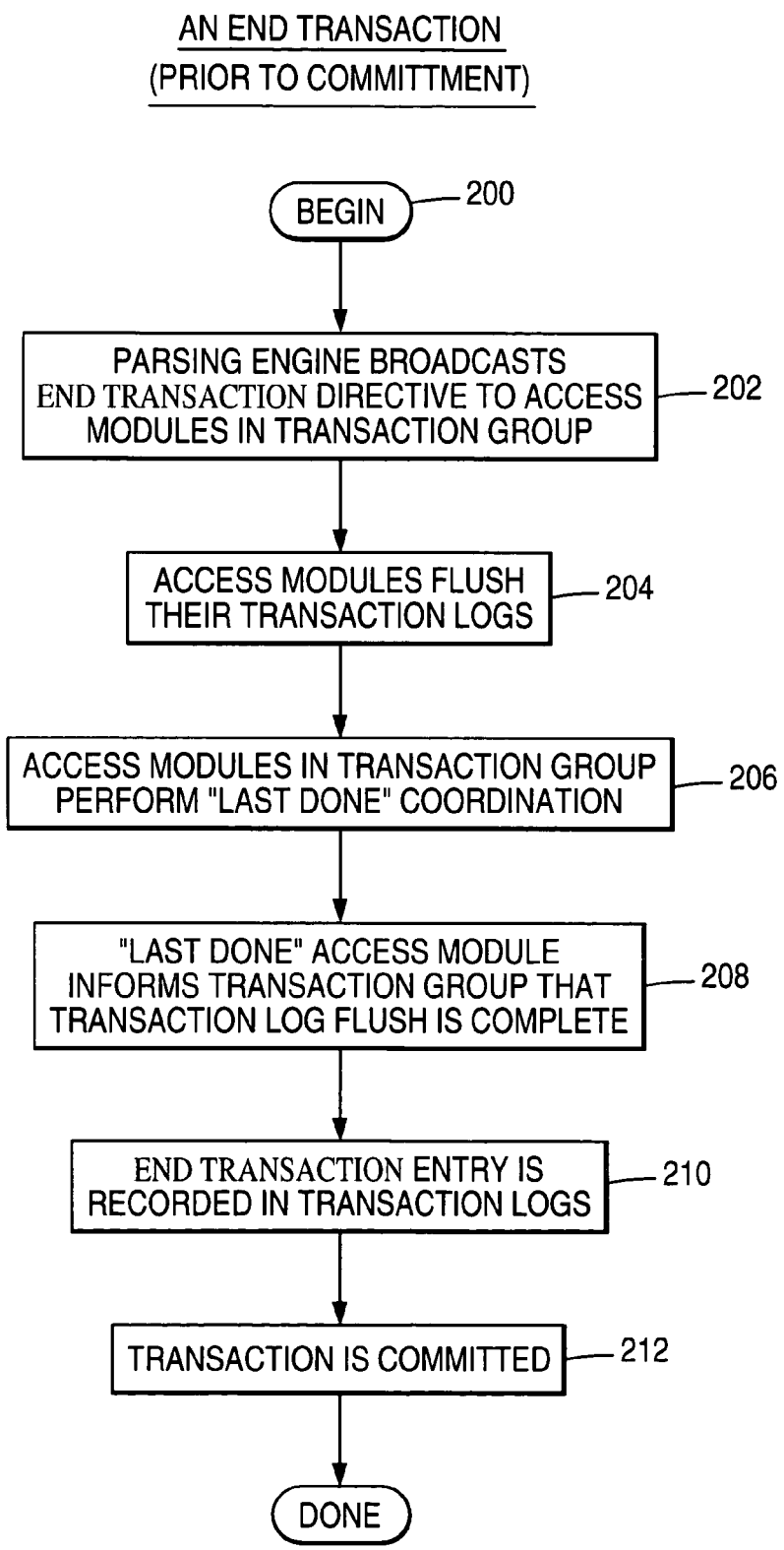
FIG. 5 is a flow diagram illustrating part of an end transaction according to one embodiment of the invention.

The commitment of a transaction 34 during end transaction processing is depicted in the flow diagram of FIG. 5, according to one embodiment. The end transaction processing may commence automatically, in the case of an implicit transaction, or after receiving notification from the client 44 that the transaction is ended, e.g., an explicit transaction. The parsing engine 10 broadcasts an END TRANSACTION directive to all access modules 20 involved in the transaction 34 (block 202). Each access module 20 flushes its transaction log 25 (block 204). Because the access modules 20 are distributed, a "last done" coordination between the access modules 20 is performed, according to one embodiment (block 206).

"Last done" coordination ensures that all access modules 20 have completed the step 38, in this case, a log flush, before continuing to a next step 38 of the transaction 34. Essentially, "last done" coordination is a handshaking operation between the parsing engine 10 and the access modules 20 whenever the step 38 involves multiple access modules 20. In this example, the transaction 34 may not be committed until all transaction logs 25 have been flushed.

The "last done" coordination safeguards against premature commitment of the transaction 34. "Last done" coordination may be performed whenever multiple access modules 20 together perform a single step 38, not just during end transaction processing.

The last access module 20 to flush its transaction log 25 informs the other access modules 20, and the parsing engine 10, that the flush operation, for the entire transaction 34, is complete (block 208). The access modules 20 record the END TRANSACTION directive to their respective transaction logs 25 (block 210). The transaction 34 is now committed (block 212).

In one embodiment, the end transaction involves further processing, such as for performing delayed action work or other operations not pertinent here. Just to get the transaction committed, however, as illustrated in FIG. 5, the end transaction processing involved a broadcast, a flush of the transaction log 25, and a "last done" coordination between the access modules 20.

In terms of bandwidth requirements and elapsed time, the broadcasts and "last done" coordination operations are expensive. Depending on the number of access modules 20 involved in the transaction 34, the broadcast and "last done" coordination operations may include as few as a couple of messages or as many as thousands of messages.

The flushes from memory cache to storage 30 may be costly as well. Since access times for non-volatile media such as hard disk drives are generally much slower than memory cache accesses, one optimization that may improve performance of the RDBMS is to decrease the number of writes to stable storage 30.

First Optimization: Add Log Flush To Last Step Of "All Transaction Group" Transaction Where the last step 38 of the transaction 34 is known, the parsing engine 10 may optimize the transaction 34 so that some of the end transaction processing, described in FIG. 5, may be avoided. In one embodiment, the optimization is performed for all implicit transactions in which the last step 38 of the transaction is performed on all access modules 20 associated with the transaction 34, e.g., all members of the transaction group.

With implicit transactions, the last step 38 may be ascertained. With steps 38 that are performed on all access modules 20 within a transaction group, according to one embodiment, the optimization performs a flush of the transaction log 25 during the last "all transaction group" step, just prior to the "last done" coordination. A beneficial effect of the optimization is the elimination of a broadcast, a transaction log flush, and a "last done" coordination step during end transaction processing, which enhances efficiency and improves overall system performance.

For example, in FIGS. 2 and 3, the transaction 34ab includes steps 38a, 38b, 38c, 38d, 38e, 38f, and 38g, involving the access modules 20a, 20k, 20p, 20r, 20t, 20v, and 20x (the transaction group). Where any of the steps 38 of the transaction 34 involve all access modules 20 of the transaction group, the step is an "all transaction group" step. Where the "all transaction group" step 38 is the last step of an implicit transaction, the first optimization may be performed. All access modules 20 involved in the transaction 34b are included. Where the transaction 34b is an implicit transaction, the transaction 34b may thus be optimized, according to one embodiment.

Figure 6:
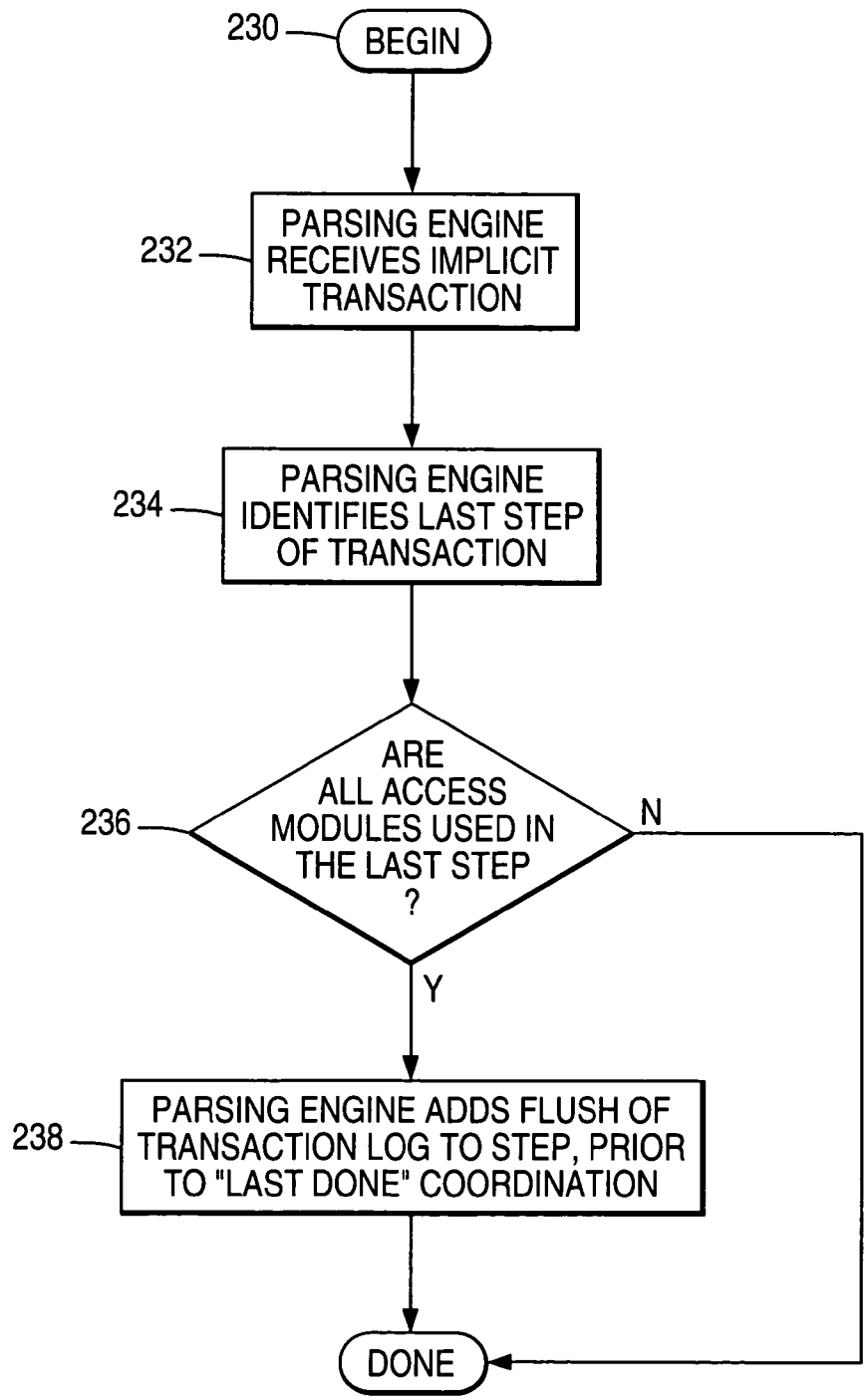
FIG. 6 is a flow diagram of an optimization performed by the RDBMS of FIG. 1 according to one embodiment of the invention.

In FIG. 6, according to one embodiment, the parsing engine 10 identifies an implicit transaction 34 (block 232), suitable for optimization. The parsing engine 10 identifies the last step 38 of the transaction 34 (block 234). Recall that identifying the last step 38 of the transaction 34 is possible because the transaction 34 is an implicit transaction.

In one embodiment, the parsing engine 10 determines whether the last step 38 of the transaction 34 uses all the access modules 20 associated therewith (diamond 236). If not, no further action is taken by the parsing engine 10 to optimize the end transaction processing.

However, where all access modules 20 are part of the step 38, the parsing engine 10 adds a flush of the transaction log 25 directive to the last step 38, just prior to a "last done" coordination operation (block 238). For example, the directive can be provided with a message communicated to perform the last step. As used here, "provided with" means that the directive can be added into the message or provided along with the message. The "last done" coordination may be expected during the last step 38 because the step 38 is performed by all members of the transaction group.

Because the step 38 being modified is the last step, the step 38 will be followed by an end transaction step. The flush of the transaction log 25 added to the last step 38 obviates the need to flush the transaction log 25 during end transaction processing. In essence, the flush during the last step 38 is an "early" flush that is done just prior to the "last done" coordination that is already performed in the last step 38.

Since the transaction log 25 was flushed in the last step 38, the subsequent end transaction may eliminate flushing the transaction log 25. Since no flush of the transaction log 25 is made, no "last done" coordination is necessary. For that matter, the END TRANSACTION broadcast by the parsing engine 10 to the access modules 20 may be avoided, too. The broadcast causes the access modules 20 to flush their transaction logs 25, but the flush is performed in the last step 38 instead; thus, the broadcast, too, is unnecessary.

Looking back to FIG. 5, the broadcast (block 202), the log flush (block 204), and the "last done" coordination (block 206) are thus avoided, where the last "all transaction group" step 38 is optimized, as described in FIG. 6. By identifying the last step 38 of the transaction 34, the parsing engine 10 may add in the flush of the transaction log 25 and abbreviate the end transaction processing.

In another embodiment, in addition to implicit transactions, the first optimization may be performed on multiple statement requests that include an END TRANSACTION directive. Where the parsing engine 10 receives such multiple statement requests from the client 44, the parsing engine 10 is able to determine the last step 38 of the transaction (e.g., the one just prior to the END TRANSACTION directive). Once identified, the flush of the transaction log 25 may be added to the step 38 as illustrated in FIG. 6.

Second Optimization: Check For Log Flush In End Transaction Processing

A second optimization to the end transaction operation may be performed, in some embodiments. When an "all transaction group" step is processed, a response sent by each access module to the parsing engine 10 includes state information about the transaction log 25 for the transaction 34. The state information includes whether all the logs 25 for the transaction 34 were flushed or not, for example.

Thus, according to one embodiment, instead of flushing the transaction log 25 in the last step 38, the parsing engine 10 may read the transaction log 25 as part of the response received from the access modules 20. Where the transaction log 25 identifies that a flush of the transaction log 25 just took place, the end transaction processing may be simplified.

Figure 7:
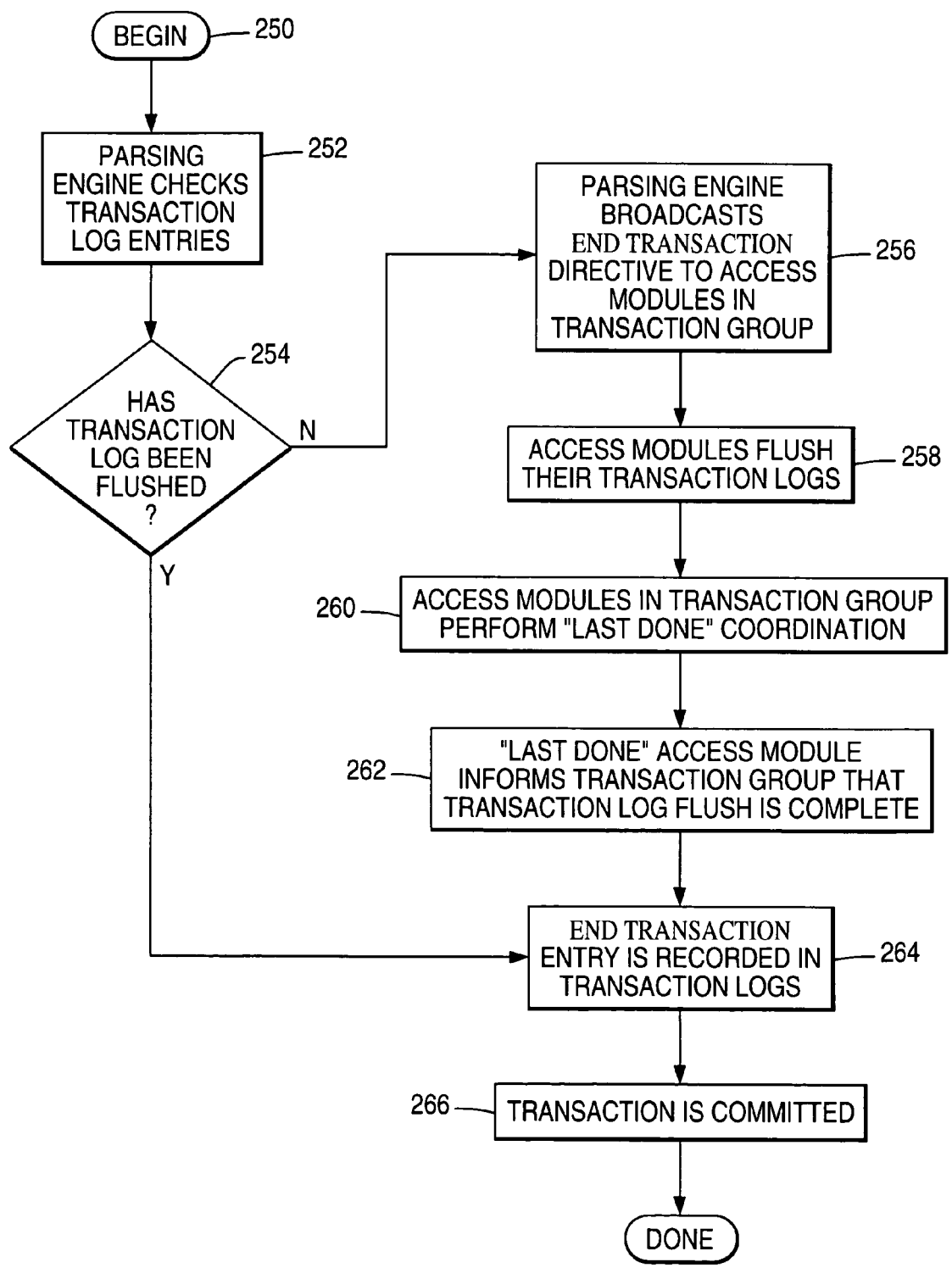
FIG. 7 is a flow diagram of an optimization end transaction performed by the RDBMS of FIG. 1 according to one embodiment of the invention.

This second optimized end transaction processing is depicted in FIG. 7, according to one embodiment. The parsing engine 10 checks information from the transaction log 25 of each access module 20, to determine whether the transaction log 25 has been flushed recently (block 252), such as during processing of the last step of the transaction for any reason. If the transaction log 25 has been flushed, the end transaction processing proceeds by entering an END TRANSACTION entry in the transaction logs 25 of all access modules 20 (block 264). As with the first optimization the broadcast, the log flush and "last done" coordination is avoided. The transaction 34 is thus optimally committed (block 266).

If, on the other hand, the transaction log 25 has not been recently flushed, the second optimization is not performed. As normal, the parsing engine broadcasts the END TRANSACTION directive to all access modules 20 associated with the transaction 34 (block 256). Each access module 20 next flushes its transaction log 25 (block 258). The access modules 20 that make up the transaction group perform "last done" coordination, to ensure that all portions of the transaction log 25 are flushed (block 260). The "last done" access module 20 informs the transaction group that the transaction log 25 is flushed (block 262). The END TRANSACTION entry is made in the transaction logs 25 (block 264). At this time, the transaction 34 is committed (block 266).

Where all the access modules 20 involved in a transaction are accessed, there is an increased likelihood that the transaction log 25 will, at some time, be flushed. Thus, during end transaction processing, the parsing engine 10 may identify whether a flush of the transaction log 25 was performed before the last step 38 in the transaction 34. If so, the end transaction processing may skip the flush of the transaction log 25 (block 258), as well as the "last done" coordination (block 260), and even the initial broadcast (block 256).

Checking the state of the transaction log 25 is not costly in terms of processing time when done on the access module 20. Thus, as a part of the "last done" processing for the "all transaction group" step (e.g., block 238 of FIG. 6), all access modules 20 check the state of the transaction log 25 and pass the state information to the parsing engine 10. The second optimization process, as described in FIG. 7, may then proceed.

Third Optimization: Access Modules Within The Same Cluster

Figure 8:
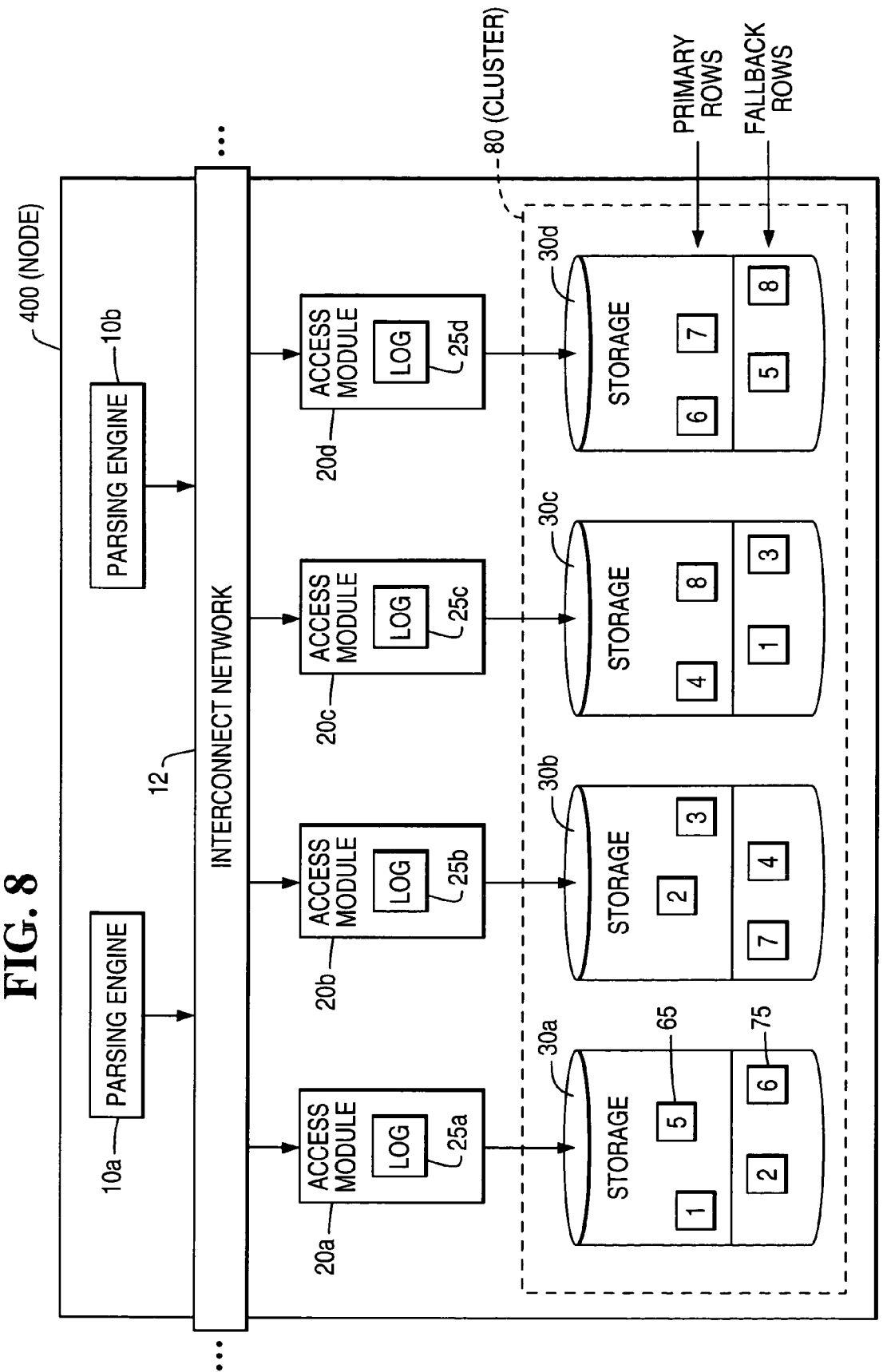
FIG. 8 is a block diagram of a node employing fallback according to one embodiment of the invention.

A third optimization exploits the fallback feature of the RDBMS 100, according to one embodiment. Fallback is a redundancy operation in which a copy of a data portion, such as a row of a table, is automatically stored on a different access module 20 than where the original of the data portion is stored. Fallback is depicted in FIG. 8. The storage modules 30a-30d of node 400 includes rows 65 of data. Each storage 30 includes both primary rows 65 and fallback rows 75.

In the RDBMS 100, according to one embodiment, , a cluster 80 is a group of access modules 20 that act as a single fallback unit. In FIG. 8, access modules 20a, 20b, 20c, and 20d are all part of the same cluster 80. In one embodiment, clusters may have two to sixteen access modules 20. One access module 20 for each cluster may fail, yet the database is fully recoverable because of fallback. However, when a second access module 20 fails in the same cluster, the system may be inoperable.

When an access module 20 fails, a copy of both the primary rows 65 and the fallback rows 75 are available. For example, in FIG. 8, if access module 20b fails, storage 30b is unavailable. However, the primary rows 65 on the storage 30b may be recovered from storage 30a (fallback row "2") and storage 30c (fallback row "3"). Likewise, fallback rows 75 on the storage 30b may be recovered from storage 30d (primary row "7") and storage 30c (primary row "4"). If, additionally, access module 20a failed, the system would stop working. According to one embodiment, fallback is performed on both database data and control information, such as the transaction logs 25.

Figure 9:
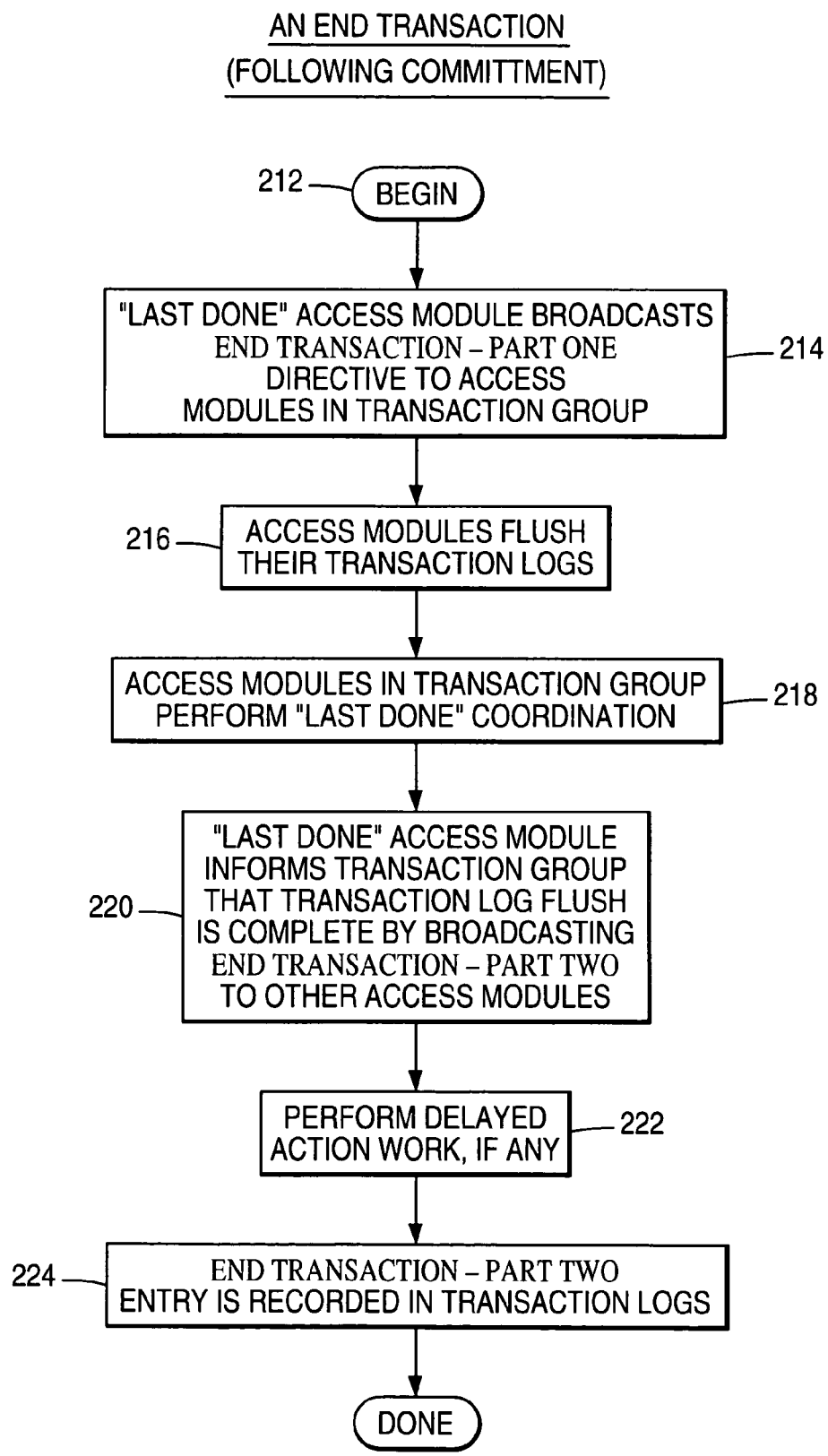
FIG. 9 is a flow diagram of end transaction following commitment of a transaction according to one embodiment of the invention.

In addition to the operations of FIG. 5, an end transaction involves further processing following commitment of the transaction, according to one embodiment. As noted above, commitment occurs once the transaction log 25 in each access module 20 has been flushed, using one of the end transaction techniques described above in connection with FIGS. 5-7. In FIG. 9, following commitment (block 212 of FIG. 5, for example) of the transaction 34, the "last done" access module broadcasts an END TRANSACTION—PART ONE directive to the access modules 20 in the transaction group (block 214).

The access modules 20 flush their respective transaction logs 25 (block 216). As with other multiple access module transactions, the access modules 20 perform "last done" coordination, to ensure that all transaction logs 25 are flushed before continuing (block 218).

The "last done" access module 20 informs the transaction group that the transaction log 25 is flushed. According to one embodiment, this notification occurs when the "last done" access module 20 broadcasts an END TRANSACTION—PART TWO directive to the other access modules 20 in the transaction group (block 220). At this time, any delayed action work is performed (block 232).

Delayed actions are specialized operations that are not typically performed. Instead, a delayed action may arise where large amounts of data are operated upon. To avoid having the transaction log 25 grow to an unwieldy size, a delayed action may be invoked. Once the delayed action work is complete, the END TRANSACTION—PART TWO directive is recorded in the transaction logs 25 (block 224). End transaction processing, following commitment of the transaction, is thus complete.

Although the END TRANSACTION—PART ONE directive is broadcast to all access modules 20 involved in the transaction 34, the transaction 34 may be reconstructed so that just one of the access modules records the directive in its transaction log, according to one embodiment. Using this fallback principle the part of the end transaction following transaction commitment (e.g., as described in FIG. 9) may also be optimized. As shown in FIG. 10, where the end transaction involves access modules 20 within a cluster 80, one or more end transaction broadcasts may be avoided. Instead of broadcasting the END TRANSACTION—PART ONE directive to all access modules 20, (see block 214 of FIG. 9) only the "last done" access module 20 writes the directive to its transaction log 25 (block 402). The "last done" access module 20 then flushes its transaction log 25 (block 404). The "last done" access module then sends the END TRANSACTIONS—PART ONE directive to its fallback access module (block 406). Once the directive is received, the fallback access module also writes the directive to its transaction log 25 (block 408) and then flushes the transaction log 25 to stable storage 30 (block 410).

The END TRANSACTION—PART ONE directive is thus sent to two access modules 20 and to their transaction logs 25 in the same cluster 80, the "last done" access module and its fallback access module. Since only one access module 20 in the cluster 80 may be down, the parsing engine 10 may nevertheless be able to complete the transaction 34, where this third optimization is performed. Because the flush is occurring on two, rather than all, transaction logs 45, the need to perform "last done" coordination is avoided.

The selection of the fallback access module may occur in a variety of ways. A fallback access module for each access module may be predefined, for example. In one embodiment, the access module selects the fallback access module based on the row being modified and the access module in the cluster that includes the other copy of the row.

After the transaction log 25 has been flushed, the fallback access module broadcasts an END TRANSACTION—PART TWO directive to all the access modules 20 involved in the transaction 34 (block 412). At this point, delayed action work may be performed, if necessary (block 414). Finally, the remaining access modules 20 write the END TRANSACTION—PART TWO directive into their respective transaction logs 25 (block 416). The third optimization is thus complete, according to one embodiment.

The various nodes and systems discussed each includes various software layers, routines, or modules. Such software layers, routines, or modules are executable on corresponding control units. Each control unit includes a microprocessor, a microcontroller, a processor card (including one or more microprocessors or microcontrollers), or other control or computing devices. As used here, a "controller" refers to a hardware component, software component, or a combination of the two.

The storage devices referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines, modules, or layers in the various devices or systems are stored in respective storage devices. The instructions when executed by a respective control unit cause the corresponding node or system to perform programmed acts.

The instructions of the software routines, modules, or layers are loaded or transported to each node or system in one of many different ways. For example, code segments including instructions stored on floppy disks, CD or DVD media, a hard disk, or transported through a network interface card, modem, or other interface device are loaded into the device or system and executed as corresponding software routines, modules, or layers. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computer implemented method of performing a transaction in a database system, comprising:
   receiving a transaction to be performed, wherein the transaction is processed by a plurality of access modules; and
   before any directive indicating commencement of an end transaction procedure is broadcast to the access modules, performing a flush of a transaction log from volatile storage to non-volatile storage by each of the access modules.

2. The method of claim 1, further comprising issuing a request to flush the transaction log with a message sent to each of the access modules for performing a last step of the transaction, the last step performed prior to commencement of the end transaction procedure.

3. The method of claim 2, further comprising performing the flush of the transaction log in a data access step prior to commencement of the end transaction procedure to avoid performance of a transaction log flush in the end transaction procedure.

4. The method of claim 2, further comprising determining that the last step is being performed by all of the plurality of access modules involved in the transaction.

5. The method of claim 1, further comprising determining if the transaction log has been flushed before performing the end transaction procedure.

6. The method of claim 5, further comprising avoiding performance of a transaction log flush in the end transaction procedure if the transaction log has been flushed.

7. The method of claim 1, further comprising:
   identifying the transaction as an implicit transaction.

8. The method of claim 1, further comprising:
   performing the end transaction procedure.

9. The method of claim 8, performing the end transaction procedure comprising:
   skipping broadcast of the directive indicating commencement of the end transaction procedure to the plurality of access modules.

10. A computer implemented method of performing an end transaction procedure in a database system, comprising:
    after commitment of a transaction, a first access module in the database system writing an end transaction indication to a first transaction log portion in volatile storage, the first access module being part of a cluster of access modules; and
    the first access module sending an end transaction directive to a fallback access module associated with the first access module, the fallback access module being part of the cluster.

11. The method of claim 10, wherein the first access module sends the end transaction directive to the failback access module but not to other access modules in the cluster.

12. The method of claim 10, wherein sending the end transaction directive comprises sending an end transaction-part one directive.

13. The method of claim 12, further comprising the fallback access module broadcasting an end transaction-part two directive to all access modules in the cluster.

14. The method of claim 10, further comprising the fallback access module writing an end transaction indication to a second transaction log portion in volatile storage.

15. The method of claim 10, further comprising the first access module flushing the first transaction log portion from volatile storage to non-volatile storage.

16. The method of claim 10, further comprising the first access module flushing the first transaction log portion from volatile storage to non-volatile storage but the other access modules in the cluster not flushing their respective transaction log portions.

17. A database system comprising:
    persistent storage;
    volatile storage; and
    a plurality of access modules, wherein each access module is coupled to the persistent storage and the volatile storage; and
    each of the access modules being adapted to flush a transaction log maintained by the access module from the volatile storage to the persistent storage before any directive indicating commencement of an end transaction procedure is broadcast to the access modules.

18. The database system of claim 17, further comprising a controller adapted to determine if each access module has flushed the transaction log maintained by the access module before commencement of the end transaction procedure.

19. The database system of claim 18, wherein the controller is adapted to skip sending a directive to perform a transaction log flush if the controller determines that each access module has flushed the transaction log before commencement of the end transaction procedure.

20. The database system of claim 17, further comprising a controller adapted to provide a flush directive with a message to each of the access modules to perform a last step of the transaction before commencement of the end transaction procedure.

21. An article comprising a computer readable storage medium storing instructions for enabling a processor-based system to:
  receive a transaction to be performed, wherein the transaction is processed by a plurality of access modules;
  determine that a last step of the transaction involves the plurality of access modules, wherein the last step is performed before any directive indicating commencement of an end transaction procedure is broadcast to the access modules; and
  flush a transaction log from volatile storage to a non-volatile storage while the last step is performed by the plurality of access modules.

22. The article of claim 21, further storing instructions for enabling the processor-based system to:
  perform the end transaction procedure, wherein the end transaction procedure follows execution of the last step of the transaction.

23. The article of claim 22, further storing instructions for enabling the processor-based system to:
  avoid broadcast of any directive indicating commencement of the end transaction procedure to the plurality of access modules.

24. A computer implemented method of performing a transaction in a database system, comprising:
  receiving a transaction to be performed on plural access modules in the database system;
  maintaining a log in volatile storage to track operations performed in the transaction; and
  writing the log to persistent storage before any directive indicating commencement of an end transaction procedure is broadcast to the plural access modules.

25. The method of claim 24, wherein writing the log to persistent storage comprises flushing the log.

26. The method of claim 24, wherein maintaining the log comprises maintaining a transaction log.

27. The method of claim 24, further comprising performing the end transaction procedure, the end transaction procedure comprising writing an end transaction indication into the log.

28. A database system comprising:
  persistent storage;
  volatile storage;
  access modules coupled to the persistent storage and the volatile storage; and
  a parsing engine coupled to the access modules, the parsing engine adapted to perform one of:
    (a) providing a directive with a message to perform a last step of a transaction and communicating the directive to the access modules, each access module responsive to the directive to perform a transaction log flush from the volatile storage to the persistent storage before any directive indicating commencement of an end transaction procedure is broadcast to the access modules; and
    (b) determining if each of the access modules has performed a transaction log flush before start of the end transaction procedure;
  the parsing engine adapted to avoid sending a broadcast directive to the access modules to cause performance of a transaction log flush during the end transaction procedure.

29. The method of claim 1, wherein the transaction comprises plural steps, the method further comprising:
  performing the plural steps prior to performing the end transaction procedure, and
  wherein performing the flush of the transaction log comprises performing the flush of the transaction log in one of the plural steps.

30. The method of claim 29, wherein performing the plural steps comprises performing, in each of the plural steps, access of relational table data stored in the database system.

31. The method of claim 29, wherein performing the flush of the transaction log in one of the plural steps comprises performing the flush of the transaction log in a last one of the plural steps.

32. The method of claim 1, further comprising each access module adding a first entry to the transaction log to redo the transaction by the access module in case of system failure.

33. The method of claim 4, wherein performing the flush of the transaction log is prior to commencement of the end transaction procedure if the last step is performed by all of the plurality of access modules, the method further comprising:
  performing the flush of the transaction log in the end transaction procedure if the last step is not performed by all of the plurality of access modules.

34. The database system of claim 17, wherein the access modules are further adapted to perform a transaction comprising plural steps, and to perform the flush of the transaction log in one of the plural steps.

35. The database system of claim 34, wherein the one of the plural steps comprises a last one of the steps.

36. The database system of claim 35, wherein the transaction log comprises a first entry associated with each access module to enable a redo of the transaction in case of system failure.

37. The database system of claim 36, wherein the transaction log further comprises a second entry associated with each access module to enable an undo of the transaction.

38. The database system of claim 34, further comprising a controller adapted to determine whether a last one of the steps involves all the access modules, and in response to determining that the last one of the steps involves all the access modules, the controller further adapted to send a directive to all the access modules to perform the flush of the transaction log in the last one of the steps.

39. The database system of claim 38, in response to determining that the last step does not involve all access modules, the controller further adapted to send a directive to perform the flush of the transaction log in the end transaction procedure.

40. The article of claim 21, wherein the transaction comprises plural steps, the article further storing instructions for enabling the processor-based system to:
  perform the plural steps prior to commencement of the end transaction procedure, and
  wherein performing the flush of the transaction log comprises performing the flush of the transaction log in one of the plural steps.

41. The article of claim 40, wherein performing the plural steps comprises performing, in each of the plural steps, access of relational table data stored in a database system.

42. The article of claim 40, wherein performing the flush of the transaction log in one of the plural steps comprises performing the flush of the transaction log in a last one of the plural steps.

43. The article of claim 42, further storing instructions for enabling the processor-based system to cause each access module to add a first entry to the transaction log to redo the transaction by the access module in case of system failure.

* * * * *